(12) United States Patent
Damron

(10) Patent No.: US 7,210,026 B2
(45) Date of Patent: Apr. 24, 2007

(54) VIRTUAL REGISTER SET EXPANDING PROCESSOR INTERNAL STORAGE

(75) Inventor: Peter C. Damron, Fremont, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 484 days.

(21) Appl. No.: 10/184,333

(22) Filed: Jun. 28, 2002

(65) Prior Publication Data
US 2004/0003208 A1 Jan. 1, 2004

(51) Int. Cl.
G06F 9/44 (2006.01)
G06F 9/54 (2006.01)
G06F 12/08 (2006.01)

(52) U.S. Cl. ............... 712/228; 712/225; 711/205
(58) Field of Classification Search ............ 712/203, 712/225, 227, 228, 244; 711/129, 203, 205; 710/31, 74, 268
See application file for complete search history.

(56) References Cited

U.S. PATENT DOCUMENTS 5,327,567 A * 7/1994 Johnson .............. 712/227
5,745,770 A * 4/1998 Thangadurai et al. ....... 710/260
5,828,903 A * 10/1998 Sethuram et al. ............. 710/53
6,233,599 B1   5/2001 Nation et al.
6,253,299 B1 * 6/2001 Smith et al. ................ 711/171
6,357,016 B1 * 3/2002 Rodgers et al. ............. 713/601

FOREIGN PATENT DOCUMENTS

EP           0851343 A2    7/1998

* cited by examiner

*Primary Examiner*—Daniel Pan
(74) *Attorney, Agent, or Firm*—Zagorin O'Brien Graham LLP (57) ABSTRACT

A processor includes a set of registers, each individually addressable using a corresponding register identification, and plural virtual registers, each individually addressable using a corresponding virtual register identification. The processor transfers values between the set of registers and the plural virtual registers under control of a transfer operation. The processor can include a virtual register cache configured to store multiple sets of virtual register values, such that each of the multiple sets of virtual register values corresponds to a different context. Each of the plural virtual registers can include a valid bit that is reset on a context switch and set when a value is loaded from the virtual register cache. The processor can include a virtual register translation look-aside buffer for tracking the location of each set of virtual register values associated with each context.

47 Claims, 6 Drawing Sheets

| OPCODE 302 | MISCELLANEOUS BITS 304 | REGISTER ID 306 | VREGISTER ID 308 | MISCELLANEOUS BITS 312 |
|---|---|---|---|---|

| ASSEMBLY INSTRUCTION | DESCRIPTION |
|---|---|
| movrv    reg,   vreg | move 32 bits from integer register to virtual register |
| movvr    vreg,  reg  | move 32 bits from virtual register to integer register |
| movxrv   reg,   vreg | move 64 bits from integer register to virtual register |
| movxvr   vreg,  reg  | move 64 bits from virtual register to integer register |
| fmovsrv  freg,  vreg | move 32 bits from floating point register to virtual register |
| fmovsvr  vreg,  freg | move 32 bits from virtual register to floating point register |
| fmovdrv  freg,  vreg | move 64 bits from floating point register to virtual register |
| fmovdvr  vreg,  freg | move 64 bits from virtual register to floating point register |
| fmovqrv  freg,  vreg | move 128 bits from floating point register to virtual register |
| fmovqvr  vreg,  freg | move 128 bits from virtual register to floating point register |

VIRTUAL REGISTER SET EXPANDING PROCESSOR INTERNAL STORAGE

BACKGROUND

1. Field of the Invention

The invention relates to register usage in a processor, and in particular, the provision of additional register storage through the use of a virtual register set.

2. Description of the Related Art

Computer systems typically include, amongst other things, a memory system and one or more processors and/or execution units. The memory system serves as a repository of information, while a processor reads information from the memory system, operates on the information, and stores results to the memory system.

Processors have a large number of internal registers, with the objective of providing enough registers that most program data can be supplied from this high-speed, local storage. Register usage is an important resource allocation issue for compilers. A compiler is responsible for translating a high-level-language program into code that can be efficiently executed by the processor. This requires that the compiler allocate registers to program variables to reduce the communication with the memory system. In general, the goals of register allocation and of software scheduling are at odds with one another. The register allocator wants to allocate as few registers to as much data as possible to decrease the possibility that there will not be enough registers. On the other hand, the scheduler wants to maintain as many independent computations as possible, meaning that additional registers are needed to store the intermediate results of parallel computations.

When internal registers are full, operands and results typically stored locally must be stored in the memory system. However, memory access is much slower than register-to-register operations. Computer performance can be greatly enhanced if unnecessary memory accesses can be eliminated and faster internal register operations can be utilized.

Processor speeds and parallelism continue to increase, also causing local storage requirements to increase. An efficient compiler will produce more parallel operations to keep the processor at optimum performance. However, each of these parallel operations requires storage for operands and results. Again, when internal registers are full, operands and results typically stored locally must be stored in the memory system.

A simple solution to enhance computer performance would be to add additional internal registers. Unfortunately, the number of internal registers available for local storage is often limited by the instruction set. An instruction typically includes an opcode to identify the instruction, several register identification fields for identifying registers to supply operands and store results, and occasionally an immediate value field to supply a constant value as an operand. Typically, register identification fields are limited to a small finite number of bits limiting the overall number of unique register identifiers. For example, a single 5 bit register identifier field in an instruction used to identify a specific internal register limits the architecture to a maximum of 32 internal registers. Modification of the instruction set to expand the number of bits in the register identifier field could be performed, but this solution would break backward compatibility with older versions of software. In other words, the expanded register identifier field would result in previous generation code that could not be executed on new processors. Work-arounds are available, but often involve an operating system to trap on certain conditions, introducing significant overhead in processing time and memory space.

Another possible solution would be to utilize new opcodes that identify additional internal registers. By using several values of the opcode, bits of the opcode can be utilized to identify each new register. However, opcodes are limited to a certain number of bits, limiting the total number of available values and therefore instructions. Using opcode space to address new internal registers is an undesirable solution because a large portion of the limited instruction encoding values must be used.

A solution is needed to provide additional internal registers to a processor architecture without breaking backward compatibility and without utilizing large amounts of opcode space.

SUMMARY

Accordingly, it has been discovered that even within the confines of a instruction set architecture that defines a limited number of addressable registers, additional virtual register storage can be provided by utilizing new opcodes and available instruction fields to address additional register storage from which (and to which) values can be transferred under control of executable instructions or operations. In this way, a larger set of available register storage locations can be provided for use by register-hungry applications. Additional register transfer instructions or operations can be defined to manage the transfer of values between a particular addressable register and various virtual registers. In some processor implementations, large numbers of corresponding virtual registers, e.g., 32, 128, . . . 8K, or more, can be implemented. Techniques of the present invention may be employed with or without support for other register management techniques, such as register windowing (overlapped or otherwise).

In some processor implementations, only a subset of the defined set of virtual registers need be implemented as physical registers on the processor. For example, in some realizations, a predefined subset of the virtual registers (e.g., low-order virtual registers) may be implemented using physical registers from (and to) which values may be directly transferred, while remaining virtual registers (e.g., higher order virtual registers) can be serviced using, for example, a trap operation. In some realizations, a caching scheme can be utilized to improve processor performance, for example, during context switches.

Accordingly, in one embodiment, a processor includes a set of registers, each individually addressable by register operations executable on the processor using a corresponding register identification; and plural virtual registers, each individually addressable by virtual register operations executable on the processor using a corresponding virtual register identification; such that the processor transfers values between the set of registers and the plural virtual registers under control of a transfer operation.

In another embodiment, less than all of an available virtual register space is implemented by a particular instance of the processor; and at least some unimplemented virtual registers are accessed utilizing a trap and emulate operation.

In another embodiment, the register operations, the virtual register operations, and the transfer operation correspond to instructions of an instruction set of the processor.

In another embodiment, the transfer operation is an instruction of an instruction set of the processor.

In another embodiment, the processor includes a virtual register cache configured to store multiple sets of virtual register values, such that each of the multiple sets of virtual register values corresponds to a different context.

In another embodiment, each of the plural virtual registers includes a valid bit that is reset on a context switch and set when a value is loaded from the virtual register cache.

In another embodiment, the processor includes a virtual register translation look-aside buffer for tracking the location of each set of virtual register values associated with each context.

In another embodiment, each of the plural virtual registers includes a valid bit, a dirty bit, and a context identification; and wherein the valid bit, the dirty bit, and context identification are used in combination to determine if a corresponding virtual register identified by the transfer operation contains at least one of: a correct value for a context of the transfer operation, a dirty value from a different context that needs to be transferred to the virtual register cache before transferring the correct value from the virtual register cache, or a different value from a different context that can be overwritten by transferring the correct value from the virtual register cache.

In another embodiment, the transfer operation includes a computation of a new value.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The description that follows presents a series of systems, apparati, methods and techniques that facilitate additional local register storage through the use of a virtual register set in a processor. While much of the description herein assumes a single processor, process or thread context, some realizations in accordance with the present invention provide expanded internal register capability customizable for each processor of a multiprocessor, each process and/or each thread of execution. Accordingly, in view of the above, and without limitation, certain exemplary exploitations are now described.

Figure 1:
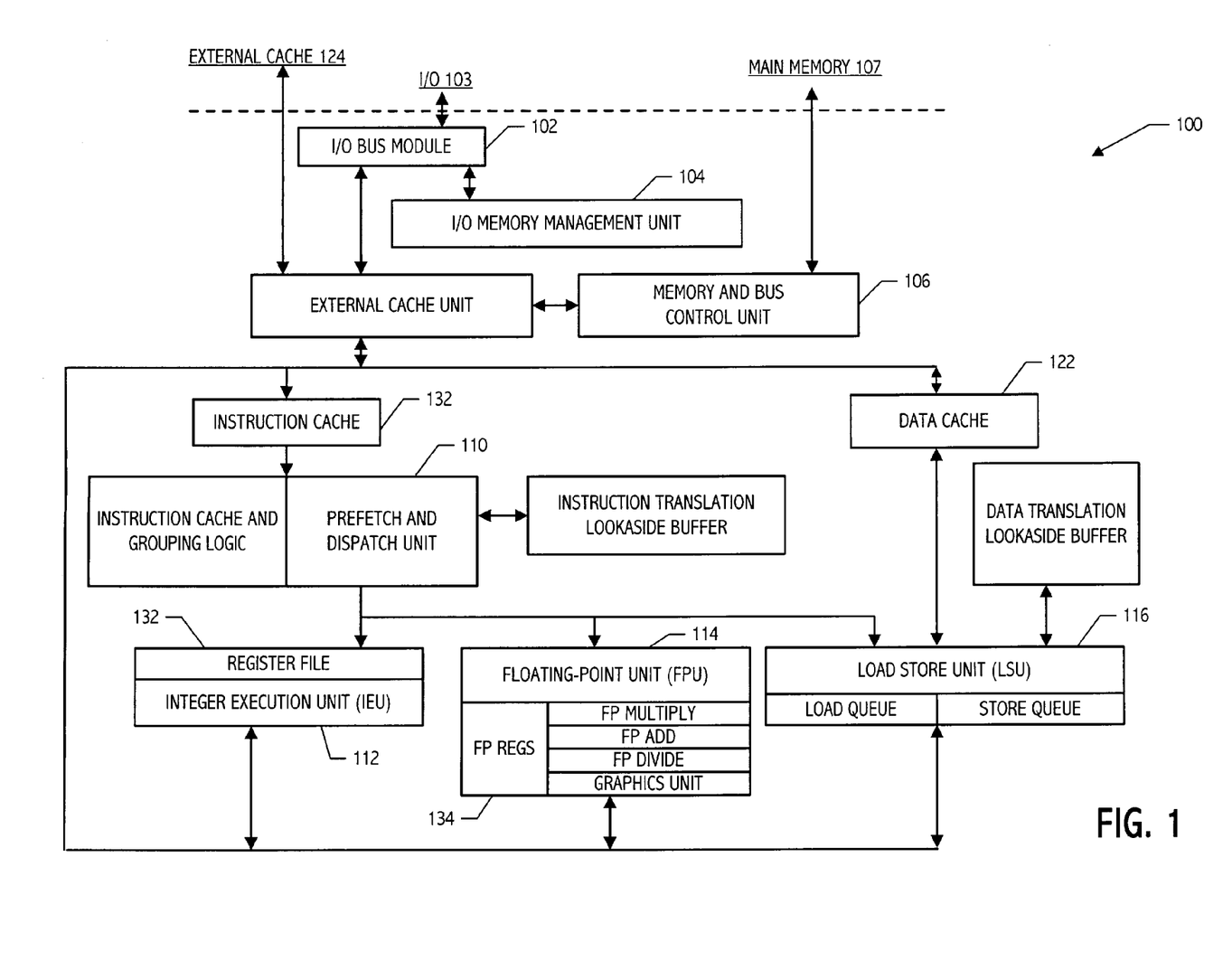
FIG. 1 is a block diagram depicting an illustrative processor architecture that includes various internal register sets, and in which techniques of the present invention can be employed to provide additional internal register storage in accordance with some embodiments of the present invention.

FIG. 1 is a block diagram depicting an illustrative processor architecture that includes various internal register sets and in which techniques of the present invention can be employed to provide additional internal register storage in accordance with some embodiments of the present invention. Processor 100 integrates an I/O bus module 102 to interface directly with an I/O bus 103, an I/O memory management unit 104, and a memory and bus control unit 106 to manage all transactions to main memory 107. A Prefetch and Dispatch Unit (PDU) 110 ensures that all execution units, including an Integer Execution Unit (IEU) 112, a Floating Point Unit (FPU) 114, and a Load-Store Unit (LSU) 116, remain busy by fetching instructions before the instructions are needed in the pipeline. A memory hierarchy of processor 100 includes a data cache 122 associated with LSU 116 as well as an external cache 124, main memory 107 and any levels (not specifically shown) of additional cache or buffering. Instructions can be prefetched from all levels of the memory hierarchy, including instruction cache 132, external cache 124, and main memory 107.

IEU 112 can include multiple arithmetic logic units for arithmetic, logical and shift operations, and one or more integer multipliers and dividers. IEU 112 is also integrated with a multi-window internal register file 132 utilized for local storage of operands.

Internal register file 132 has, for example, 32 64-bit registers which are addressed utilizing a 5-bit register identifier field in an integer instruction. Internal register file 132 is partitioned, for example, into 4 sets of 8 registers: in, out, local, and global registers. The in and out registers are typically used for passing parameters to and receiving results from subroutines, and for keeping track of the memory stack. A procedure can store a temporary value in an out register with the understanding that the value is volatile across procedure calls. A function returns a scalar integer value by writing the scalar integer value into an in register. The local registers are typically used for automatic variables and for most temporary values. For access efficiency, a compiler can also copy parameters from the memory stack into the local registers and use them from there. Typically, the global registers are used for temporaries, global variables, or global pointers, such as either user variables or values maintained as part of a program's execution environment. For example, one could use global registers in the execution environment by establishing a convention that global scalars are addressed via offsets from a global base register.

Local, in and out registers can have register windows controlled by SAVE and RESTORE instructions. A register window defines a current portion of a much larger register set, wherein only that current portion is accessed at a given time. For example, internal register file 132 can have eight windows of 16 registers with only 24 registers accessible at any one time. The current window is given by the current window pointer (CWP) register. The CWP is decremented by the RESTORE instruction and incremented by the SAVE instruction. SAVE and RESTORE instructions move the window up and down like a stack. Register windows are used to pass parameters between functions. Register windowing expands the amount of storage provided by the internal register set. However, only a portion of that storage is available at any given time. Additionally, SAVE and RESTORE instructions tend to be slow operations. Further, if all internal storage is full, an overflow condition occurs which causes the processor to generate a trap. On a trap, the Operating System (OS) saves the information to memory, causing significant processing overhead.

FPU 114 can include multiple separate functional units to support floating-point and multimedia operations. The separation of execution units enables processor 100 to issue and execute multiple floating-point instructions per cycle. Source and data results are stored in a multi-entry FPU internal register file 134.

FPU internal register file 134 has, for example, 32 32-bit floating point registers, used by FPU 114 and LOAD and STORE instructions. Alternatively, FPU internal register file 134 can be used as 16 64-bit registers or 8 128-bit registers. A scalar floating-point value is returned in the floating-point registers. Like the global registers, the floating-point registers must be managed by software. Compilers use the floating-point registers for user variables and compiler temporaries, pass floating-point parameters, and return floating-point results in them.

LSU 116 is responsible for generating the virtual address of all loads and stores, for accessing the data cache, for decoupling load misses from the pipeline through the load queue, and for decoupling the stores through a store queue. One load or one store can be issued per cycle. During context switches LOAD and STORE instructions save off internal registers to memory.

The design of processor 100 is reminiscent of that of certain SPARC architecture based processors. Note that descriptions and/or terminology consistent with the SPARC architecture are used herein purely for illustrative purposes and, based on the description herein, persons of ordinary skill in the art will appreciate exploitations of the present invention suitable for a wide variety of processor implementations and architectures. SPARC architecture based processors are available from Sun Microsystems, Inc., Palo Alto, Calif. SPARC trademarks are used under license and are trademarks or registered trademarks of SPARC International, Inc. in the United States and other countries. Products bearing SPARC trademarks are based upon an architecture developed by Sun Microsystems, Inc.

In the illustration of FIG. 1, storage for integer register file 132 and floating point register file 134 (which can, in some implementations, include renaming facilities, a reorder buffer or other out-of-order and/or speculative execution facilities) are integrated with IEU 112 and FPU 114, respectively. Other implementations can employ other forms or implementations of internal storage for architectural states. For example, all register files can be combined into one large register file. Alternatively, additional register files other than the ones illustrated here can be available. Suitable forms and internal storage implementations are architecture-and processor implementation-specific.

A register file, such as integer register file 132 or floating point register file 134, is typically a bank or set of storage units that are addressed through register identification fields in processor instructions. FIGS. 2A–2F illustrate exemplary instruction formats that provides for the addressing of various internal register sets through the use of register identification fields and in which techniques of the present invention can be employed to provide additional internal register storage in accordance with some embodiments of the present invention.

Figure 2A:
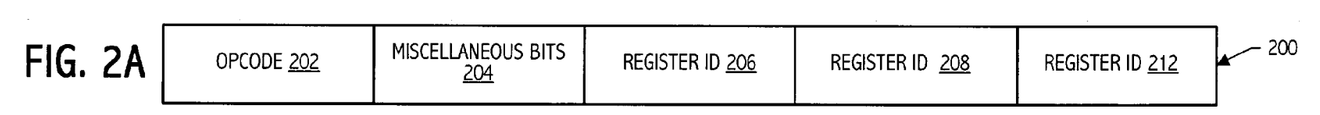
FIGS. 2A–2F illustrate exemplary instruction formats that provide for the addressing of various internal register sets and in which techniques of the present invention can be employed to provide additional internal register storage in accordance with some embodiments of the present invention.

FIG. 2A illustrates an exemplary generic instruction format. Instruction 200 has multiple fields, including an opcode 202, miscellaneous bits field 204, and register identification (ID) fields 206, 208, and 212. Opcode 202 identifies the instruction, for example, a MOVE, ADD, or a LOAD instruction. Opcodes are typically the same length across multiple instructions. Miscellaneous bits field 204 contains, for example, various instruction dependent bits or bits reserved for future instruction enhancements. For example, miscellaneous bits field 204 can contain condition codes to indicate various conditions, for example, not equal, greater than and the like, upon which if true the instruction is to be executed. Miscellaneous bits field 204 can be of varying length and are instruction dependent. Register ID field 206 identifies a particular internal register which contains a value or operand that is to be executed upon. Register ID field 208 identifies a particular internal register which contains a value or operand that is also to be executed upon. Register ID field 212 identifies a particular internal register in which the results of the instruction execution are stored. The length of register ID fields 206 is typically a fixed size, for example, the same size as register ID fields 208 and 212.

Figure 2B:
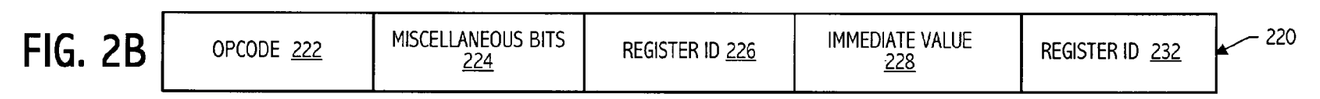

FIG. 2B illustrates another exemplary generic instruction format. Instruction 220 has multiple fields and includes an opcode 222, a miscellaneous bits field 224, register ID field 226, and register ID field 232 which are similar in functionality to opcode 202, miscellaneous bits field 204, register ID field 206, and register ID field 212, respectively, of instruction 200. Instead of an additional register ID field, instruction 220 contains an immediate value field 228 which contains a constant value which is to be executed upon. The length of immediate value field 228 can vary, for example, to be an 11, 12, or 13 bit constant, the length of which is instruction dependent.

Additional fields can be available in instruction 200 and instruction 220. Additionally, the instruction formats of FIGS. 2A and 2B are used for illustrative purposes only. Other instruction formats can be utilized in the present invention.

Figure 2C:
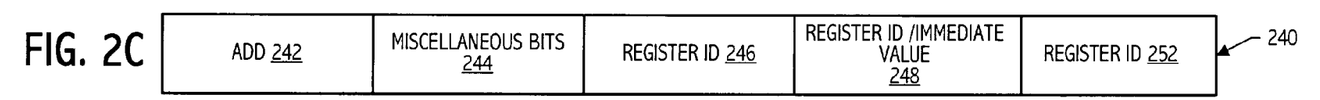
Figure 2D:
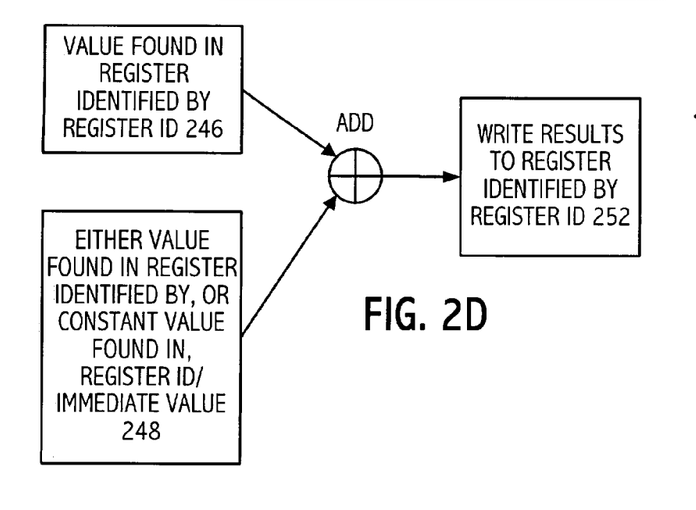

FIG. 2C illustrates an exemplary instruction format of an ADD instruction. ADD instruction 240 includes an add opcode 242, miscellaneous bits field 244, register ID field 246, register ID/immediate value field 248, and register ID field 252. FIG. 2D illustrates the execution of ADD instruction 240. The value found in the internal register identified by register ID field 246 and the value found in the internal register identified by, or the constant value found in, register ID/immediate value field 248 are added together and stored in an internal register identified by register ID field 252.

Figure 2E:
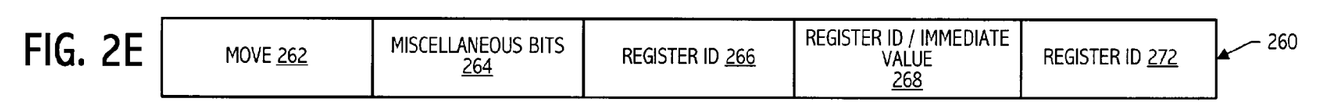
Figure 2F:
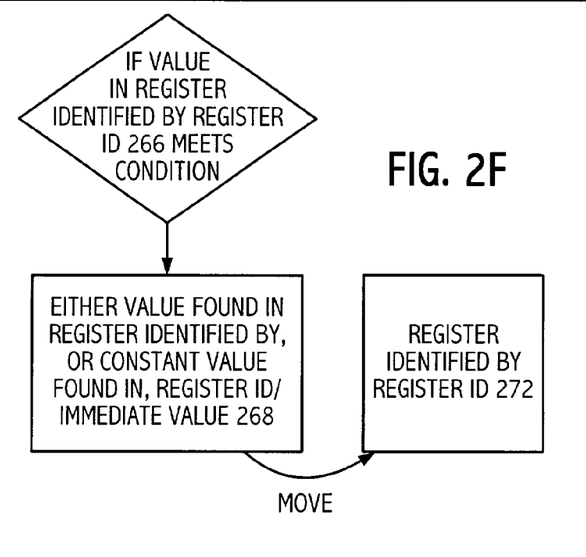

FIG. 2E illustrates the instruction format of a MOVE instruction. MOVE instruction 260 includes a move opcode 262, a miscellaneous bits field 264, a register ID field 266, a register ID/immediate value field 268, and a register ID field 272. FIG. 2F illustrates the execution of MOVE instruction 260. The value stored in the internal register identified by register ID field 266 is evaluated according to, for example, condition codes set forth in miscellaneous bits field 264. If the condition is met, either the value stored in the internal register or the constant value identified by register ID/immediate value field 268 is copied into the internal register identified by register ID field 272.

As illustrated in FIGS. 2A–2F, internal registers are accessed and identified by register identification fields in a processor instruction. According to the present invention, internal storage capability of a processor is expanded through the use of a virtual register set accessed and identified by new processor instructions. The virtual register set is an auxiliary set of registers, which can be distinct and separate from the existing internal registers in a processor. By utilizing an instruction format similar to the instruction format of instruction 220 of FIG. 2B, an immediate value field can be utilized to identify a particular register in the virtual register set. FIGS. 3A–3D illustrate exemplary instruction formats that utilize an instruction field to identify and access virtual registers in accordance with some embodiments of the present invention.

Figure 3A:
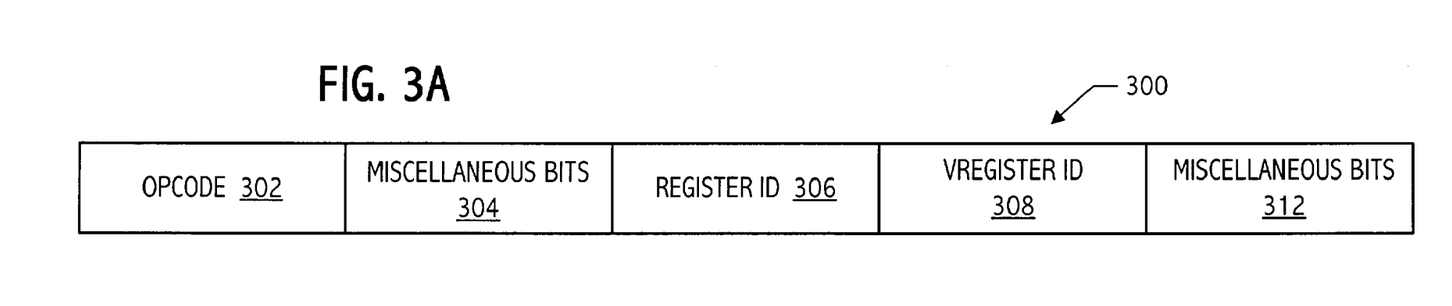
FIGS. 3A–3D illustrate exemplary instruction formats that utilize an instruction field to identify and access virtual registers in accordance with some embodiments of the present invention.
Figure 3B:
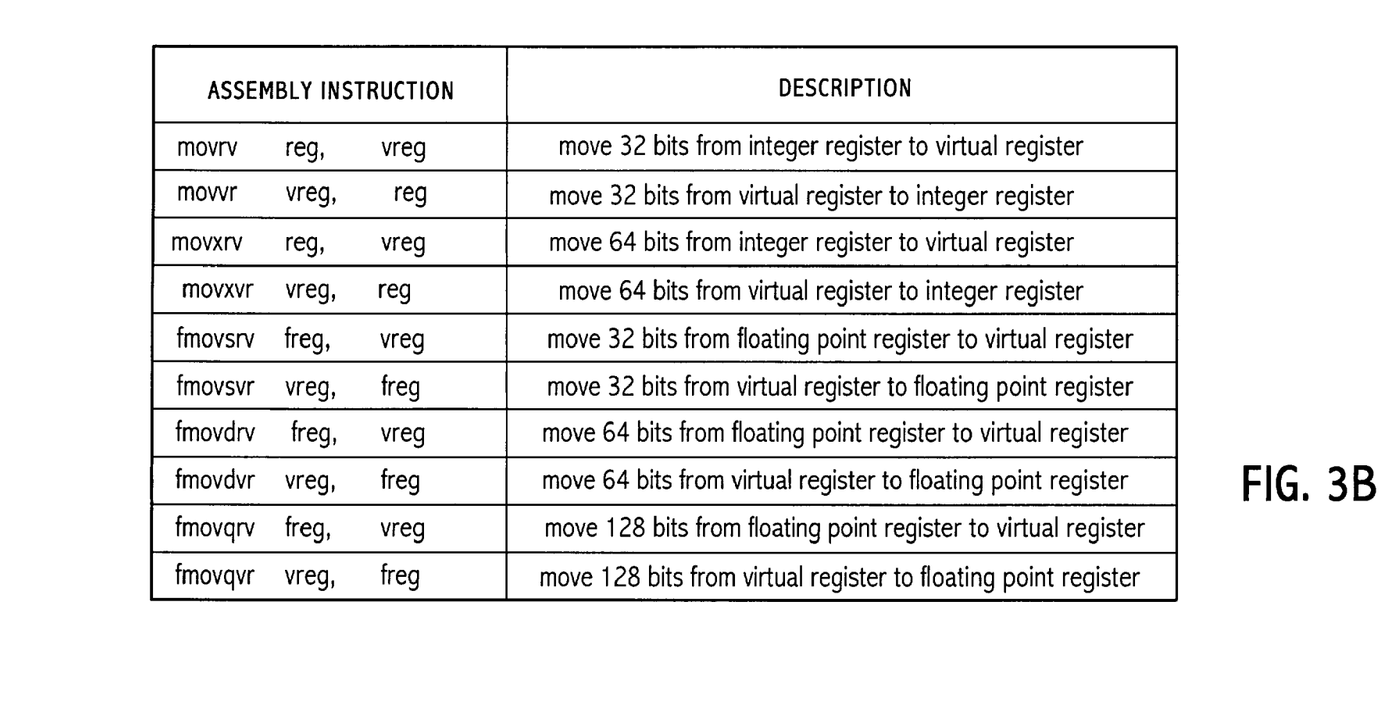

FIG. 3A illustrates an exemplary instruction format according to an embodiment of the present invention. Instruction 300 has multiple fields, including an opcode 302, miscellaneous bits 304, a register identification (ID) field 306, a virtual register ID 308, and miscellaneous bits 312. Miscellaneous bits 312 can be used for a variety of purposes. One use could be as extra opcode bits where, for example, all the move instructions of FIG. 3B could be encoded. Another use could be reserved for future enhancements. Another use could be as bits to identify something about the instruction operands (e.g., register identifier or immediate value). Still another use could be to specify an additional resource that the instruction may need, e.g., a condition code. FIG. 3B includes a table of exemplary instructions in assembly language format and a description of each function. Various opcodes can be utilized to move values between virtual registers and internal registers (including integer registers and floating point registers). In addition, move instructions can move a varying length of values, including 32-bit, 64-bit and 128-bit values. In addition, an add instruction is illustrated that reads an integer register and a virtual register and puts the computed result in another integer register.

Figure 3C:
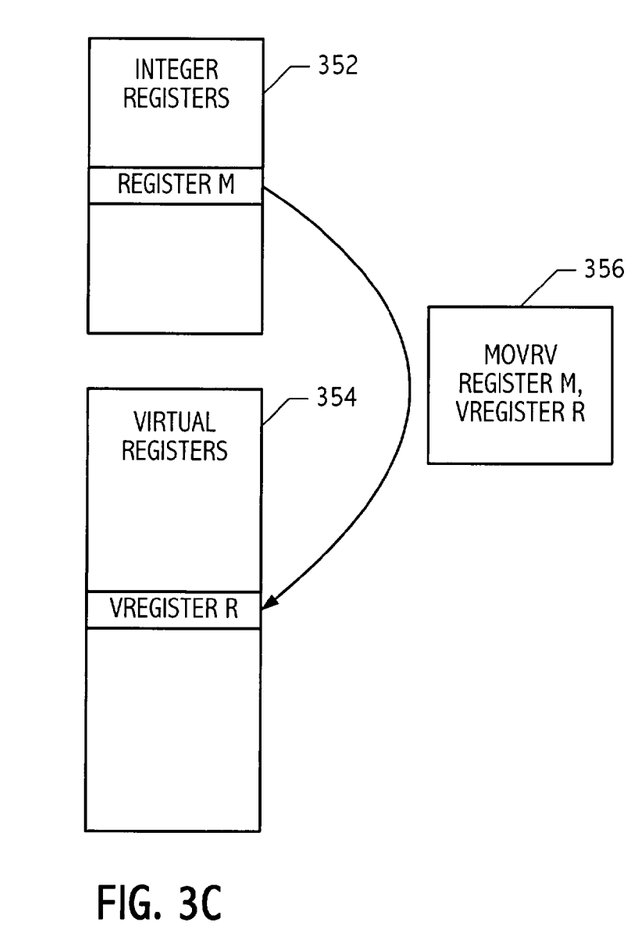
Figure 3D:
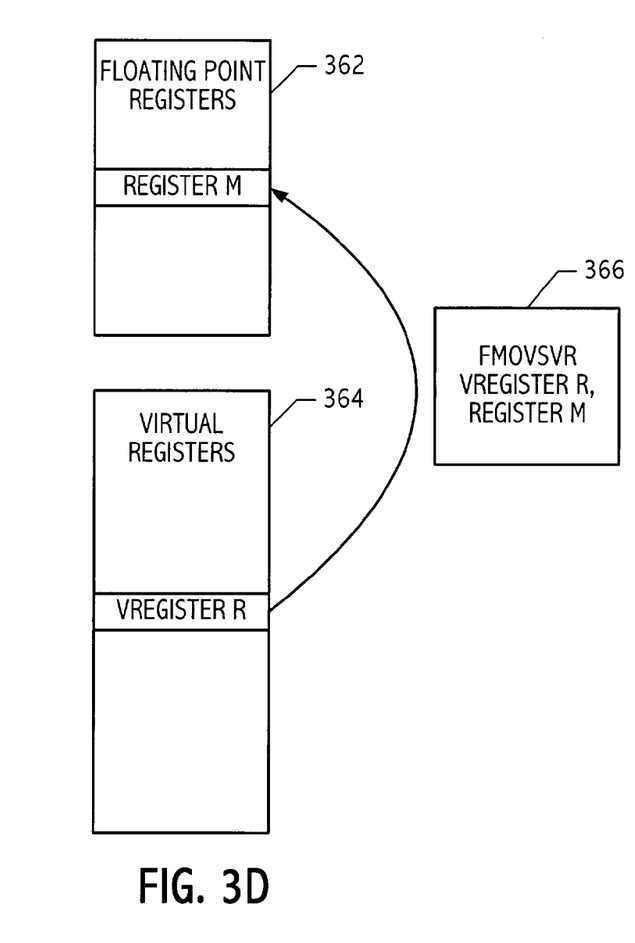

FIG. 3C illustrates a block diagram of the operation of a MOVRV instruction that moves a value from an integer register to a virtual register. Integer registers 352 are separate from virtual registers 354. MOVRV instruction 356 moves a value in integer registers 352 identified by a register identification field in the instruction to a location in virtual registers 354 identified by a virtual register ID field also in the instruction. FIG. 3D illustrates a block diagram of the operation of a FMOVSVR instruction that moves a value from a virtual register to a floating point register. Floating point registers 362 are separate from virtual registers 364. A FMOVSVR instruction 366 moves a value in virtual registers 364 identified by a virtual register ID field in the instruction to a location in floating point registers 362 identified by a register ID field also in the instruction.

FIGS. 3A–3D illustrate the operation of moving values between internal registers and virtual registers. Alternate embodiments can include additional operations, for example, mathematical operations such as adding register values together or moving values between virtual register locations.

In one embodiment, the simm13 field of a common instruction format of SPARC architecture is used for virtual register identification. The simm13 field allows a register number from 0–8191 to be encoded. The previous use of the simm13 field is to hold signed, 13-bit, immediate constants (i.e., –4096 to 4095). Because the virtual register set is accessed via new instructions and opcodes, a conflict does not occur with the standard use of the simm13 instruction field. That is, old instructions are executed in a similar fashion as previously, and only the new instructions can access the new virtual registers.

Although the examples above have relied heavily on SPARC architecture formats, another processor architecture can provide an instruction field to encode a virtual register identification field according to the present invention.

Figure 4:
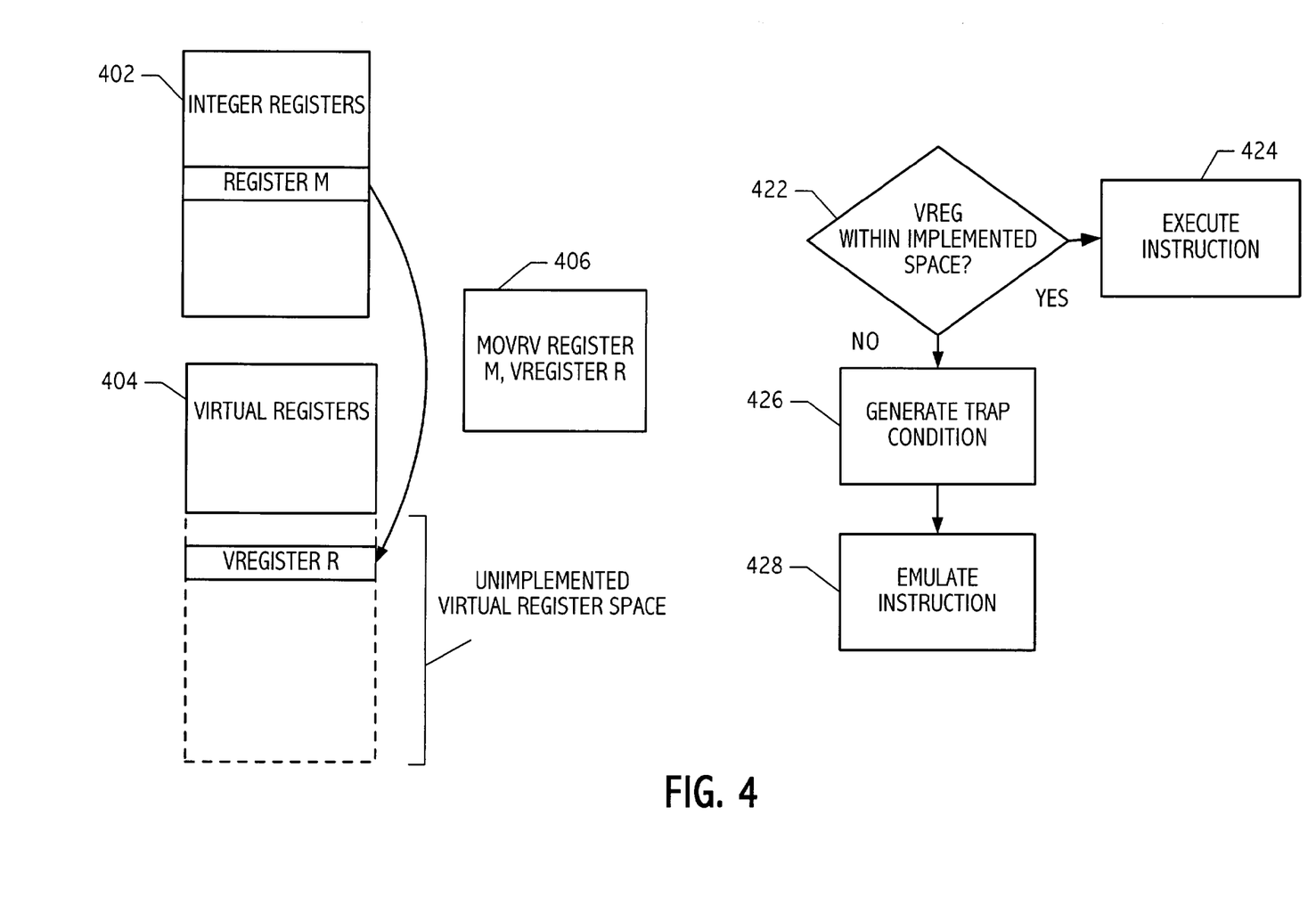
FIG. 4 illustrates a processor in which only a portion of available virtual register address space is implemented and a technique for executing code that accesses the unimplemented virtual registers in accordance with some embodiments of the present invention.

A minimum amount of instruction space has been utilized to implement the identification and access of virtual registers via instruction formats. However, tradeoffs are often be made between space/cost considerations and application speed when implementing processors. Accordingly, different versions of a processor might implement different portions of the virtual register set, for example one processor might only implement one tenth of the available virtual register space while another processor might implement the entire register space. FIG. 4. illustrates a processor in which only portion of available virtual register address space is implemented (for example, only 64 implemented registers out of a possible 8192) and a technique for executing code that accesses the unimplemented space in accordance with some embodiments of the present invention. When processing an instruction with a virtual register identification field, a determination is made whether the identified virtual register is within implemented space, step 422. If so, the instruction is executed, step 424. If not, the processor initiates a trap operation to the operating system (OS), step 426. The OS emulates the instruction, step 428. The OS can utilize, for example, a pre-reserved 64K Byte region of memory for any non-implemented virtual registers which would be sufficient for 8192 64-bit virtual registers. Alternatively, a few pages of thread local storage could be used to hold the non-implemented virtual registers. The OS can load or store the memory locations and emulate any other affects of the instruction that referenced the non-implemented virtual register. Thus, the trap mechanism described herein turns a MOVE for an unimplemented virtual register into a load/store instruction.

A large amount of local storage introduces processing overhead during context switches. A context switch occurs when a processor performing one task switches to another task. Processor tasks can include, for example, operations associated with word processing, spread sheet, and the like. During a context switch, the operating system saves all values in internal registers associated with the previous task to memory and loads the internal registers with values associated with the next task. Contexts are also referred to as processes or threads. A processor or computer system can have multiple contexts at any given time. The larger the amount of internal registers, the longer the context switch takes to complete.

Figure 5:
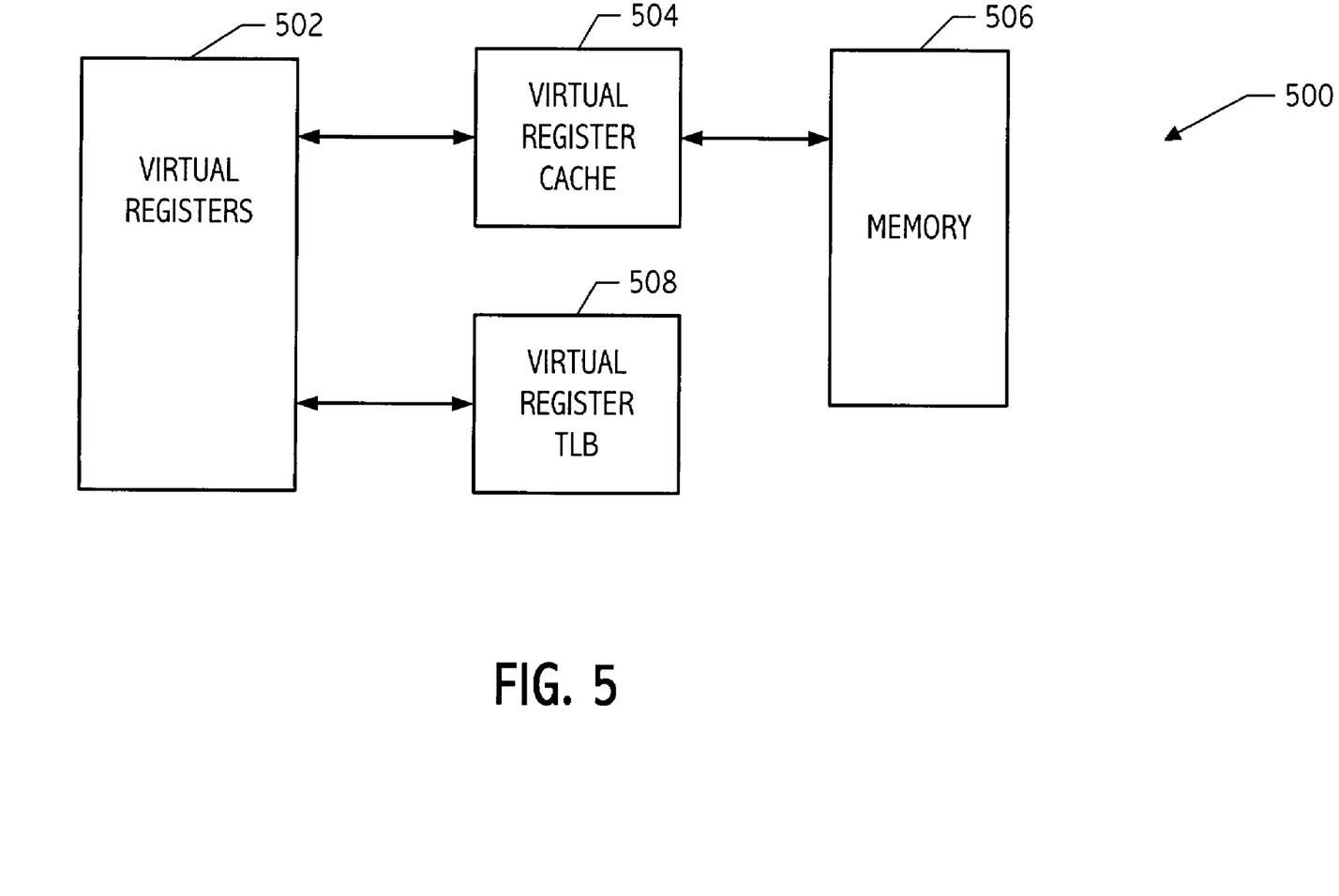
FIG. 5 illustrates the use of a virtual register cache to enhance processor performance during context switches in accordance with some embodiments of the present invention.

FIG. 5 illustrates the use of a virtual register cache to enhance processor performance during context switches according to an embodiment of the present invention. Upon a context switch, the operating system flushes the contents of virtual registers 502 to a virtual register cache 504. Virtual registers 502 each have a valid/invalid bit which is set to invalid after the flush to virtual register cache 504. As processing continues in the new context, if the valid/invalid bit is set to invalid when reading a virtual register, the register value is read from virtual register cache 504 or memory 506. A virtual register translation look-aside buffer (TLB) 508 keeps track of each context and where the associated virtual registers are in cache 504 and memory 506. When the operating system terminates (as opposed to simply switching) a process, the associated virtual register cache locations can be re-used by another context. By providing virtual registers 502 with virtual register cache 504, context switch processing is faster.

According to an alternate embodiment, virtual registers 502 do not have valid/invalid bits. During a context switch, the operating system flushes the old values to virtual register cache 504 and also loads virtual registers 502 with values for the new context from virtual register cache 504 or memory 506.

According to another embodiment, the storing of virtual registers 502 to virtual register cache 504 does not occur upon a context switch. Instead, the storing can be "lazy," such that each register is only stored as needed. Each of virtual register 502 has a "context id" field, and each context would need a "backing store address" register located in virtual register TLB 508 to determine where to load or store virtual registers 502 for that context. Upon accessing one of virtual registers 502, the context identification field is evaluated. If the context does not match the context identification field, the register contents are stored into virtual register cache 504 or memory 506 and the current context value is loaded into the register. The use of a dirty bit for each virtual register can be used to avoid storing non-dirty virtual registers into the virtual register cache when context identification does not match.

Virtual register cache 504 and virtual register TLB 508 can be implemented on the same integrated circuit as the processor and can hold multiple sets of virtual register values. Virtual register cache 504 could be separate from other caches, but more likely is integrated with the other caches in the system.

According to some embodiments of the present invention, different versions of processors can implement some or all of the available register storage. Compatibility between the different processor versions is achieved through the use of trap processing for processors that only provide a subset of the register storage available. Further, a caching scheme can be utilized to improve processor performance during context switches. Even further, by providing additional register storage, a compiler can produce more parallel operations to keep the processor at optimum performance without causing unnecessary memory accesses.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A processor comprising:
a set of registers implemented internal to the processor, each individually addressable by register operations executing on the processor using a corresponding register identification;
plural virtual registers, each individually addressable by virtual register operations executing on the processor using a corresponding virtual register identification, wherein at least one of the virtual registers is an auxiliary register implemented internal to the processor; and
a virtual register cache configured to store multiple sets of virtual register values, wherein each of the multiple sets of virtual register values corresponds to a different context;
wherein the processor transfers values between the set of registers and the plural virtual registers under control of a transfer operation, where upon a context switch values associated with a current context are loaded from the plural virtual registers into the virtual register cache and values associated with a next context are loaded from the virtual register cache into the plural virtual registers.

2. The processor, as recited in claim 1,
wherein less than all of an available virtual register space is implemented by a particular instance of the processor; and
wherein at least some unimplemented virtual registers are accessed utilizing a trap and emulate operation.

3. The processor, as recited in claim 1,
wherein the register operations, the virtual register operations, and the transfer operation correspond to instructions of an instruction set of the processor.

4. The processor, as recited in claim 1,
wherein the transfer operation is an instruction of an instruction set of the processor.

5. The processor, as recited in claim 1, wherein upon a context switch from a first context to a second context, values associated with the first context are loaded from the plural virtual registers into the virtual register cache and values associated with the second context are loaded from the virtual register cache into the plural virtual registers.

6. The processor, as recited in claim 1, wherein upon a context switch from a first context to a second context, values associated with the first context are loaded from the plural virtual registers into the virtual register cache; and wherein values associated with the second context are loaded from the virtual register cache into the plural virtual registers when accessed.

7. The processor, as recited in claim 1, wherein after a context switch from a first context to a second context, values associated with the first context are loaded from the plural virtual registers into the virtual register cache when accessed and wherein values associated with the second context are loaded from the virtual register cache into the plural virtual registers when accessed.

8. The processor, as recited in claim 1, wherein each of the plural virtual registers includes a valid bit that is reset on a context switch and set when a value is loaded from the virtual register cache.

9. The processor, as recited in claim 1, further comprising a virtual register translation look-aside buffer for tracking the location of each set of virtual register values associated with each context.

10. The processor, as recited in claim 1, it wherein the virtual register cache is integrated into a data cache that also stores multiple sets of values of the set of registers.

11. The processor, as recited in claim 1, wherein each of the plural virtual registers includes a valid bit, a dirty bit, and a context identification; and wherein the valid bit, the dirty bit, and context identification are used in combination to determine if a corresponding virtual register identified by the transfer operation contains at least one of: a correct value for a context of the transfer operation, a dirty value from a different context that needs to be transferred to the virtual register cache before transferring the correct value from the virtual register cache, or a different value from a different context that is overwritten by transferring the correct value from the virtual register cache.

12. The processor, as recited in claim 1, wherein the transfer operation includes a computation of a new value.

13. The processor of claim 1, wherein the virtual registers are not addressable by a legacy instruction set architecture (ISA).

14. A processor integrated circuit configured to:
in response to a first instruction, transfer a first value stored in a set of registers implemented internal to a processor to a location in a set of virtual registers, the set of registers each individually addressable by register operations executing on the processor using a corresponding register identification and the set of virtual registers each individually addressable by virtual register operations executing on the processor using a corresponding virtual register identification, wherein at least one of the virtual registers is an auxiliary register implemented internal to the processor; and in response to a second instruction, copy a set of values from the set of virtual registers to a virtual register cache or from the virtual register cache to the set of virtual registers, wherein the set of values corresponds to a particular context of the processor.

15. The processor integrated circuit, as recited in claim 14, further operable to:

in response to a third instruction, generate a trap operation to emulate a transfer of a second value stored in the set of registers to an unimplemented location in the set of virtual registers.

16. The processor integrated circuit, as recited in claim 14, wherein the set of virtual register values corresponds to less than all of an available number of virtual register identifications.

17. The processor integrated circuit, as recited in claim 14, wherein the set of virtual register values corresponds to less than all of an available number of virtual register identifications.

18. The processor integrated circuit of claim 14, wherein the virtual registers are not addressable by a legacy instruction set architecture (ISA).

19. A code preparation tool encoded as software executable code, stored in a computereadable storage, configured to generate code for causing on a processor to:

transfer a first value stored in a set of registers implemented internal to a processor to a location in a set of virtual registers, the set of registers each individually addressable by register operations executing on the processor using a corresponding register identification and the virtual registers each individually addressable by virtual register operations executing on the processor using a corresponding virtual register identification, wherein at least one of the virtual registers is an auxiliary register implemented internal to the processor; and copy a set of values from the set of virtual resisters to a virtual register cache or from the virtual register cache to the set of virtual registers, wherein the set of values corresponds to a particular context of the processor.

20. The code preparation tool, as recited in claim 19, further configured to:

generate a trap operation to emulate a transfer of a second value stored in the set of registers to an unimplemented location in the set of virtual registers.

21. The code preparation tool, as recited in claim 20, wherein the set of virtual register values corresponds to less than all of an available number of virtual register identifications.

22. The code preparation tool, as recited in claim 20, wherein the set of virtual register values corresponds to less than all of an available number of virtual register identifications.

23. Software encoded in one or more computer readable storage media, the software comprising:

a sequence of instructions on a processor, the sequence including one or more instructions that address a particular register of the processor and operate on a value stored therein, wherein at least one of the instructions directs the processor to transfer a value from the particular register to a virtual register of the processor, and wherein at least one other of the instructions directs the processor to copy a set of virtual register values between a set of virtual registers and a virtual register cache, wherein the set of virtual register values corresponds to a particular context of the processor, where the set of virtual register values corresponds to less than all of an available number of virtual register identifications.

24. The software, as recited in claim 23, wherein the virtual register is unimplemented and the at least one of the instructions causes the processor to generate a trap operation to emulate the transfer of the value from the particular register to the virtual register.

25. The software, as recited in claim 23, wherein the copying is from the set of virtual registers to the virtual register cache.

26. The software, as recited in claim 23, wherein the copying is from the virtual register cache to the set of virtual registers.

27. A processor comprising:

an execution unit for executing a sequence of processor instructions;

a local register set coupled to the execution unit;

a virtual register set coupled to the execution unit; and a virtual register cache configured to store multiple sets of virtual register values, wherein each set of virtual register values corresponds to a different context;

wherein the execution unit is configured to move a value stored in a register in the local register set to a virtual register in the virtual register set according to a processor instruction;

wherein a register identification field of the processor instruction identifies the register in the local register set and a virtual register identification field identifies the virtual register in the virtual register set, where upon a context switch values associated with a current context are loaded from the plural virtual registers into the virtual register cache and values associated with a next context are loaded from the virtual register cache into the plural virtual registers.

28. The processor, as recited in claim 27, wherein the virtual register set contains unimplemented registers and wherein a trap and emulate operation is initiated upon accessing one of the unimplemented registers.

29. The processor, as recited in claim 27, wherein upon a context switch from a first context to a second context, values associated with the first context are loaded from the virtual register set into the virtual register cache when accessed and values associated with the second context are loaded from the virtual register cache into the virtual register set.

30. The processor, as recited in claim 27, wherein upon a context switch from a first context to a second context, values associated with the first context are loaded from the virtual register set into the virtual register cache; and wherein values associated with the second context are loaded from the virtual register cache into the virtual register set when accessed.

31. The processor, as recited in claim 27, wherein after a context switch from a first context to a second context, values associated with the first context are loaded from the virtual register set into the virtual register cache when accessed; and wherein values associated with the second context are loaded from the virtual register cache into the virtual register set when accessed.

32. The processor, as recited in claim 27, further comprising a virtual register translation look-aside buffer configured to track the location of each set of virtual register values and an associated context.

33. The processor, as recited in claim 27, wherein the execution unit is an integer execution unit and the local register set is an integer register set.

34. The processor, as recited in claim 27, wherein the execution unit includes a floating point unit and the local register set includes a floating point register set.

35. The processor of claim 27, wherein the virtual registers are not addressable by a legacy instruction set architecture (ISA).

36. A method of operating a processor comprising:
executing an instruction sequence wherein a first instruction stores a value in a register in a local register set implemented internal to the processor, and a second instruction copies the value from the register in the local register set to a virtual register in a virtual register set, wherein the virtual register is implemented internal to the processor;
employing a virtual register cache to store multiple sets of virtual register values, wherein each of the sets of virtual register values corresponds to a different context of the processor; and
tracking a location of each of the sets of virtual register values and an associated context with a virtual register translation look-aside buffer,
wherein a register identification field of the second instruction identifies the register in the local register set and a virtual register identification field of the second instruction identifies the virtual register in the virtual register set.

37. The method, as recited in claim 36, wherein the virtual register set contains unimplemented registers and wherein a trap and emulate operation is initiated upon accessing one of the unimplemented registers.

38. The method, as recited in claim 36, wherein upon a context switch from a first context to a second context, values associated with the first context are loaded from the virtual register set into the virtual register cache when accessed and values associated with the second context are loaded from the virtual register cache into the virtual register set.

39. The method, as recited in claim 36, wherein upon a context switch from a first context to a second context, values associated with the first context are loaded from the virtual register set into the virtual register cache; and wherein values associated with the second context are loaded from the virtual register cache into the virtual register set when accessed.

40. The method, as recited in claim 36, wherein after a context switch from a first context to a second context, values associated with the first context are loaded from the virtual register set into the virtual register cache when accessed; and wherein values associated with the second context are loaded from the virtual register cache into the virtual register set when accessed.

41. A method of making a processor comprising:
during fabrication of an integrated circuit defining thereon an execution unit;
during fabrication of the integrated circuit defining thereon a local register set coupled to the execution unit;
during fabrication of the integrated circuit defining thereon a virtual register set and virtual register cache coupled to the execution unit; and
during fabrication of the integrated circuit defining thereon a virtual register translation look-aside buffer for tracking a location of each set of virtual resister values in the virtual register cache and an associated context;
wherein the execution unit is configured to move a value stored in a register in the local register set to a virtual register in the virtual register set according to a processor instruction executing on the execution unit;
wherein the virtual register cache is configured to store multiple sets of virtual register values, wherein each set of virtual register values corresponds to a different context; and
wherein a register identification field of the processor instruction identifies the register in the local register set and a virtual register identification field identifies the virtual register in the virtual register set, and wherein at least one of the virtual registers is implemented internal to the processor.

42. The method, as recited in claim 41, wherein the virtual register set contains unimplemented registers and wherein a trap and emulate operation is initiated upon accessing one of the unimplemented registers.

43. The method, as recited in claim 41, wherein upon a context switch from a first context to a second context, values associated with the first context are loaded from the virtual register set into the virtual register cache and values associated with the second context are loaded from the virtual register cache into the virtual register set.

44. The method, as recited in claim 41, wherein upon a context switch from a first context to a second context, values associated with the first context are loaded from the virtual register set into the virtual register cache; and wherein values associated with the second context are loaded from the virtual register cache into the virtual register set when accessed.

45. The method, as recited in claim 41, wherein after a context switch from a first context to a second context, values associated with the first context are loaded from the virtual register set into the virtual register cache when accessed; and wherein values associated with the second context are loaded from the virtual register cache into the virtual register set when accessed.

46. The method, as recited in claim 41, wherein the execution unit is an integer execution unit and the local register set is an integer register set.

47. The method, as recited in claim 41, wherein the execution unit includes a floating point unit and the local register set includes a floating point register set.

* * * * *